Feb. 13, 1945.   O. H. PADDOCK ET AL   2,369,368
APPARATUS FOR TEMPERING GLASS
Filed July 19, 1940   5 Sheets-Sheet 5

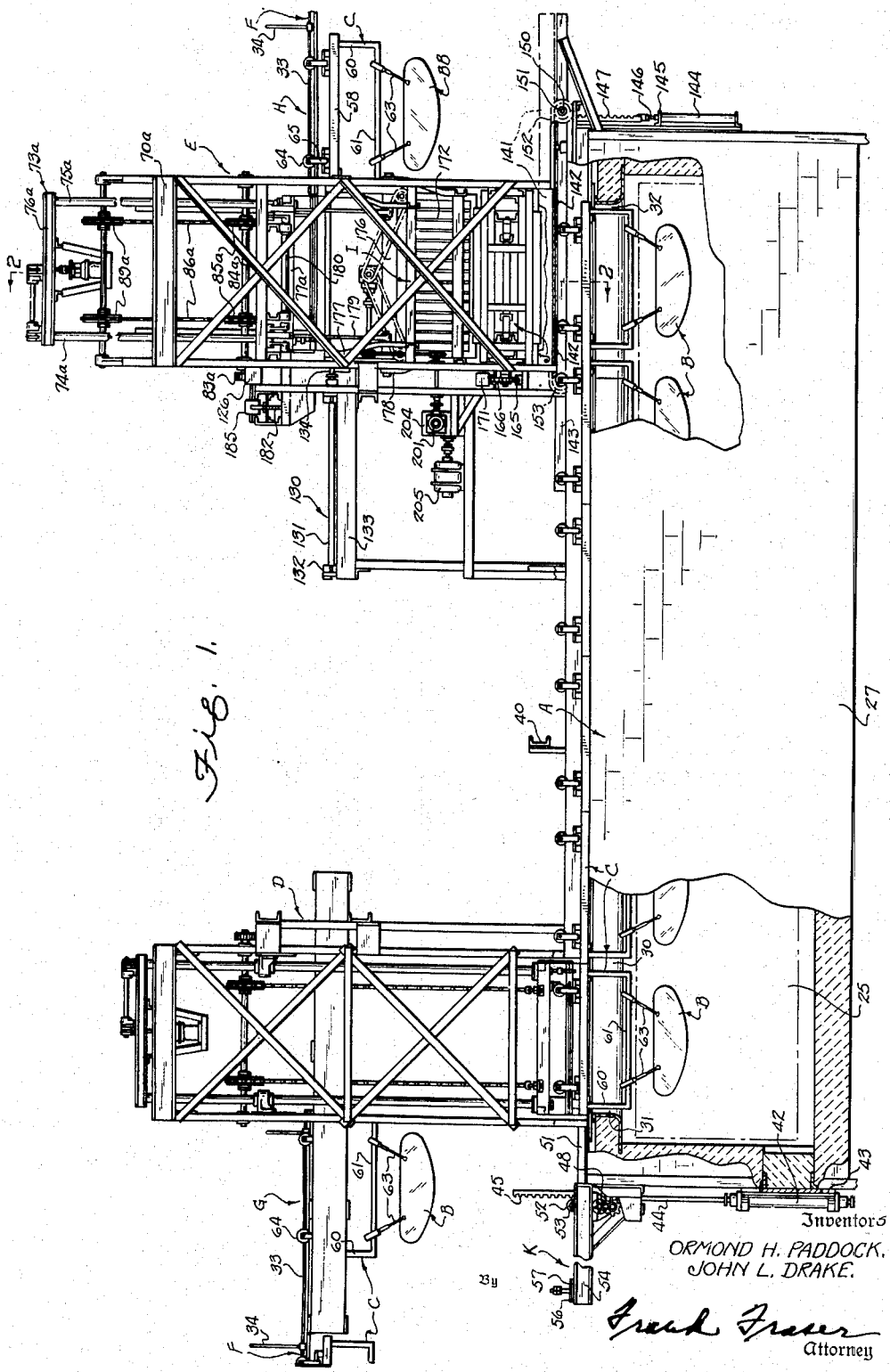

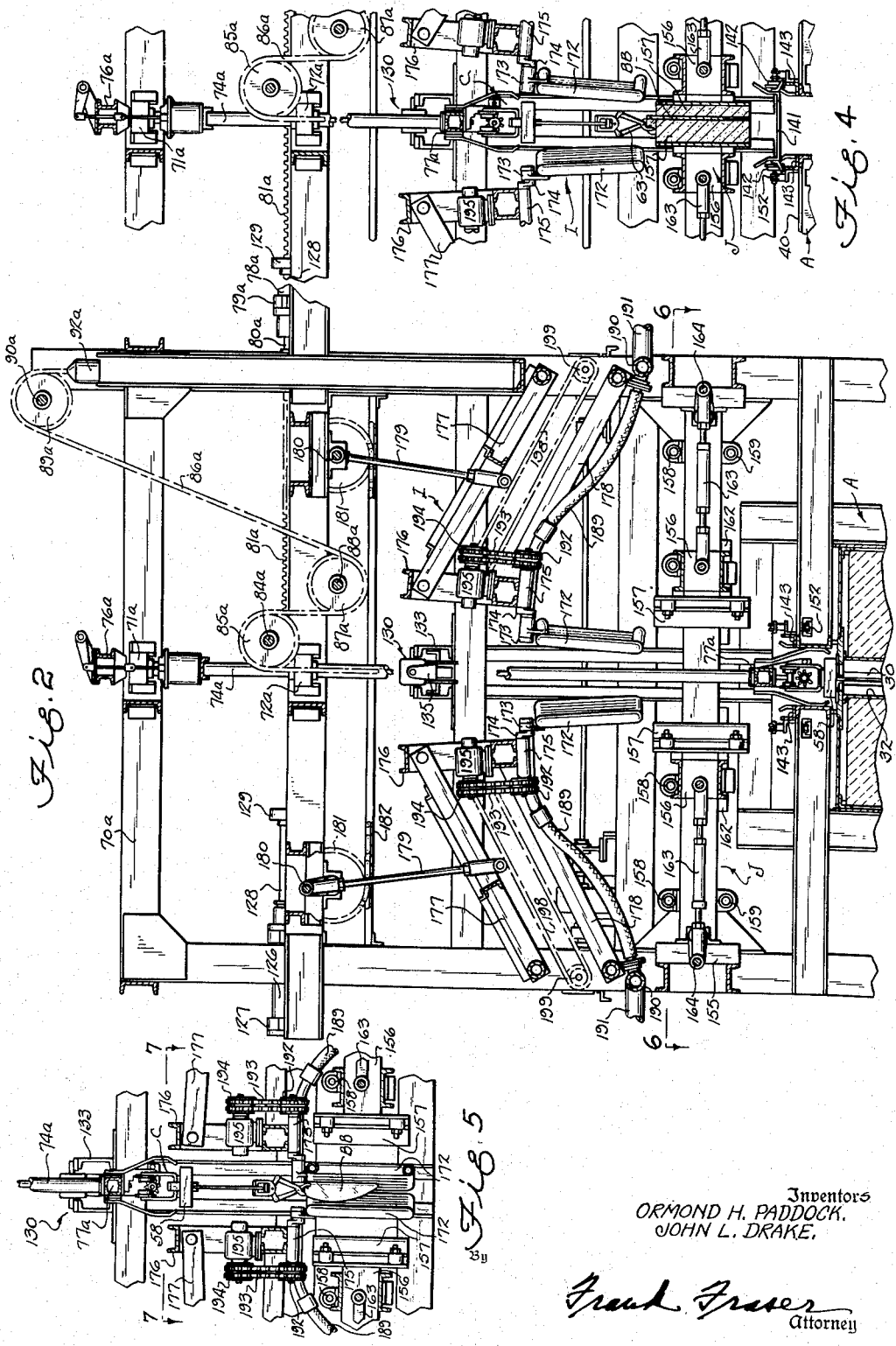

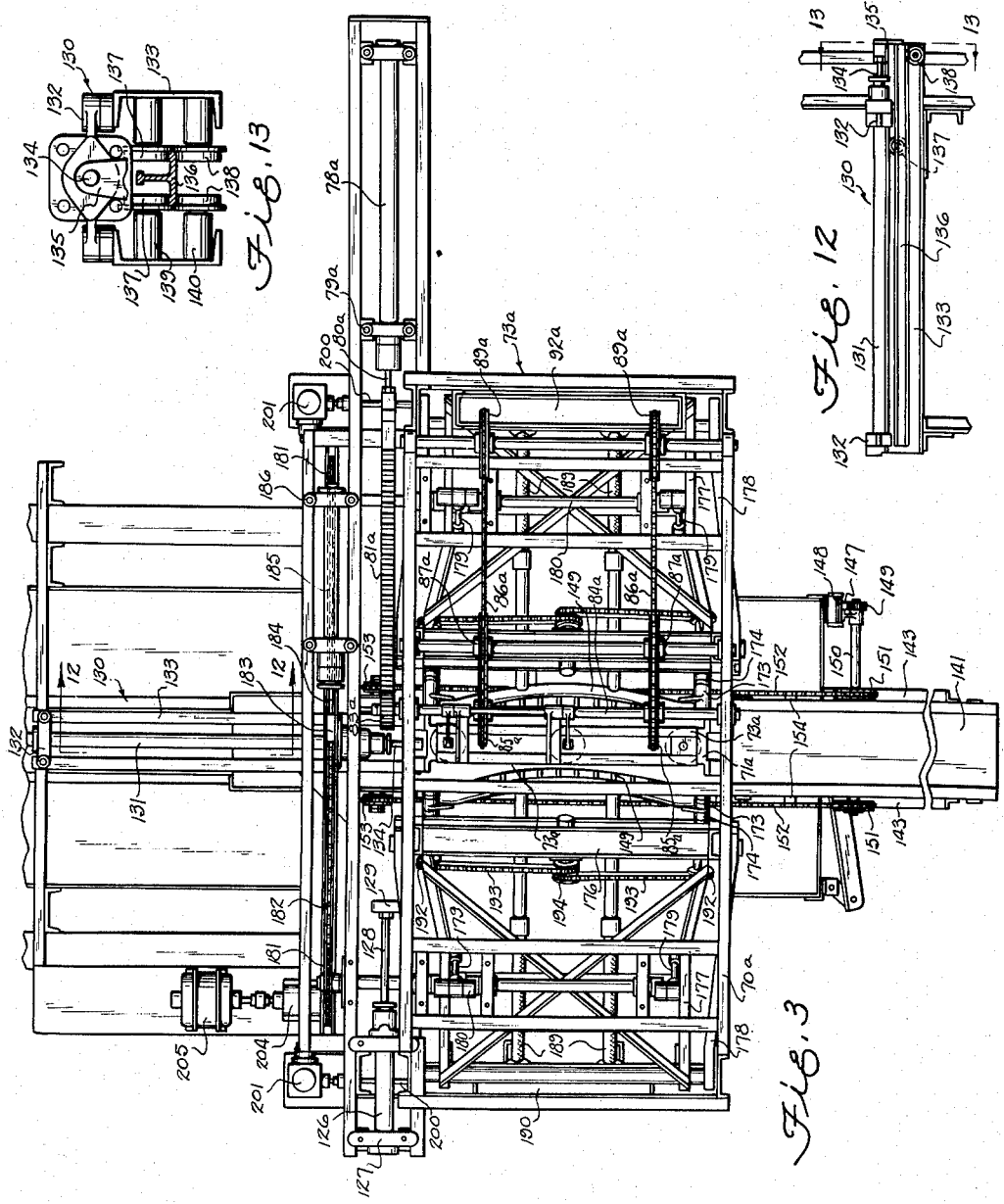

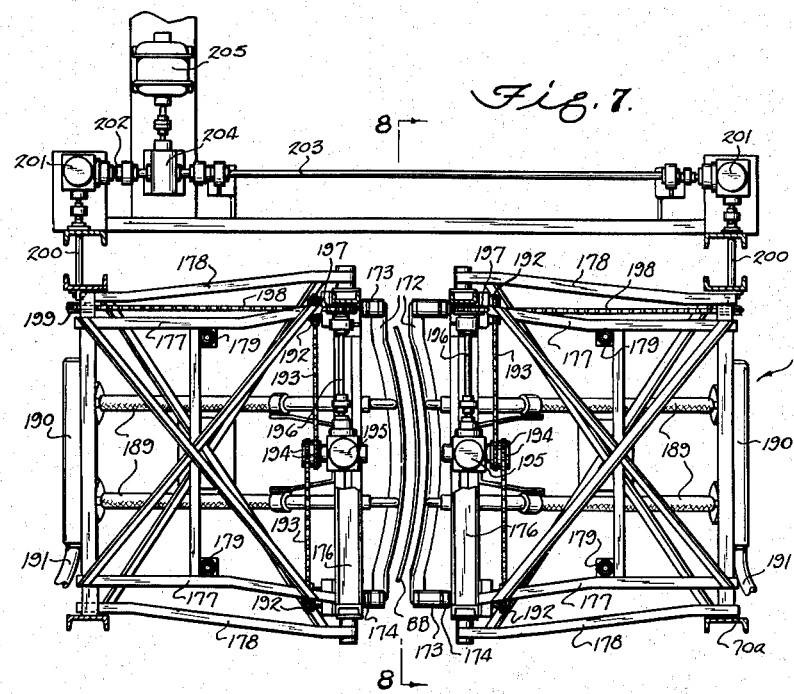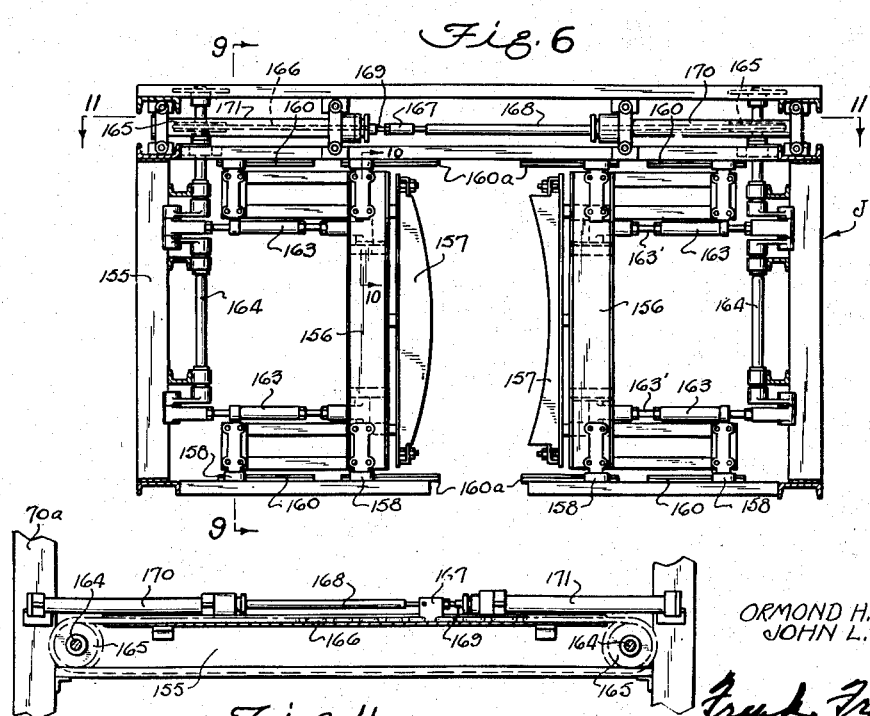

Inventors
ORMOND H. PADDOCK.
JOHN L. DRAKE.
By Frank Fraser
Attorney

Patented Feb. 13, 1945

2,369,368

UNITED STATES PATENT OFFICE 2,369,368

APPARATUS FOR TEMPERING GLASS

Ormond H. Paddock, Rossford, and John L. Drake, Toledo, Ohio, assignors to Libbey-Owens-Ford Glass Company, Toledo, Ohio, a corporation of Ohio Application July 19, 1940, Serial No. 346,402

9 Claims. (Cl. 49—1)

The present invention appertains broadly to the bending and/or tempering of glass sheets or plates or other glass articles.

More particularly, this invention relates to improved glass handling and heat treating apparatus for the continuous production of tempered glass according to that method wherein the sheets or plates are heated to a temperature approximating the softening point of the glass and then suddenly cooled, and which is adaptable for producing either flat or bent (curved) tempered glass sheets or plates.

Generally stated, the apparatus of this invention embodies a horizontally elongated heating furnace having entrance and discharge openings in the top wall thereof adjacent its opposite ends and connected by a relatively narrow longitudinal slot. Mounted above the entrance opening of the furnace is a charging elevator mechanism for introducing the glass sheets or plates into the furnace, while mounted above the discharge opening is a discharge elevator mechanism for withdrawing the heated glass sheets or plates from said furnace. The glass sheets or plates, suspended in a vertical position from cars or carriers, are moved in an intermittent step by step fashion from the entrance opening of the furnace to the discharge opening thereof and during such movement the sheets or plates are uniformly heated to a temperature approximating the softening point of the glass, which is in the neighborhood of 1250 degrees F. for ordinary flat glass. Associated with the discharge elevator mechanism is the means for suddenly cooling the heated glass sheets or plates upon withdrawal thereof from the furnace preferably by directing jets or blasts of air against opposite surfaces thereof. Also associated with the discharge elevator mechanism is the means for effecting the bending of the glass sheets or plates to a predetermined curvature prior to cooling if bent glass is being produced.

It is a primary aim of the invention to provide improved glass handling and heat treating apparatus of the above character for effecting the continuous production of either flat or bent tempered glass sheets or plates rapidly, efficiently, and economically; and which is capable of smooth, gentle operation so that the sheets or plates may be safely handled and transferred from one location or treating station to another with a minimum amount of breakage or injury to the glass.

Among the many other objects of the invention are to provide improved bending means including complemental bending molds for effecting extremely rapid completion of the bending operation with minimum danger of breakage of the glass and while subjecting the same to a minimum amount of chilling due to contact with said bending molds; to provide cooling means for effecting immediate cooling of the glass sheets or plates after bending; to provide novel means for mounting and operating the bending molds and cooling means so that they will perform alternate bending and cooling operations upon a glass sheet or plate while maintained in the same position at a common bending and cooling station; and to provide glass handling and heat treating apparatus for carrying out several operations of the tempering cycle at one time and with a minimum lapsed time per operation so that maximum production from the apparatus may be obtained.

The invention also embodies various other novel features of construction, combination, arrangement and operation which will be more fully hereinafter described and which lend themselves to the provision of a glass handling and heat treating apparatus of proven practical, commercial success, satisfactorily fulfilling the above objects and operable in a convenient manner for the continuous production of tempered glass sheets or plates, either flat or bent.

In the drawings, wherein like numerals are employed to designate like parts throughout the same:

Fig. 1 is a fragmentary side elevation of the improved glass handling and heat treating apparatus showing particularly the location of the furnace charging and discharge elevators and external conveyor, part of the furnace being broken away;

Fig. 2 is a vertical section of the discharge elevator taken substantially on line 2—2 of Fig. 1;

Fig. 3 is a fragmentary plan view of the discharge end of the furnace and the discharge elevator shown in Fig. 2;

Fig. 4 is a view similar to a portion of Fig. 2 but showing the bending molds in bending position at the bending and cooling station;

Fig. 5 is a view similar to portions of Figs. 2 and 4 but showing the air blast heads in cooling position at the bending and cooling station;

Fig. 6 is a horizontal section taken substantially on line 6—6 of Fig. 2;

Fig. 7 is a horizontal section taken substantially on line 7—7 of Fig. 5;

Fig. 11 is a vertical longitudinal section taken substantially on line 11—11 of Fig. 6;

Fig. 12 is a detail section taken substantially on line 12—12 of Fig. 3; and

Fig. 13 is a detail section taken substantially on line 13—13 of Fig. 12.

Figure 8:
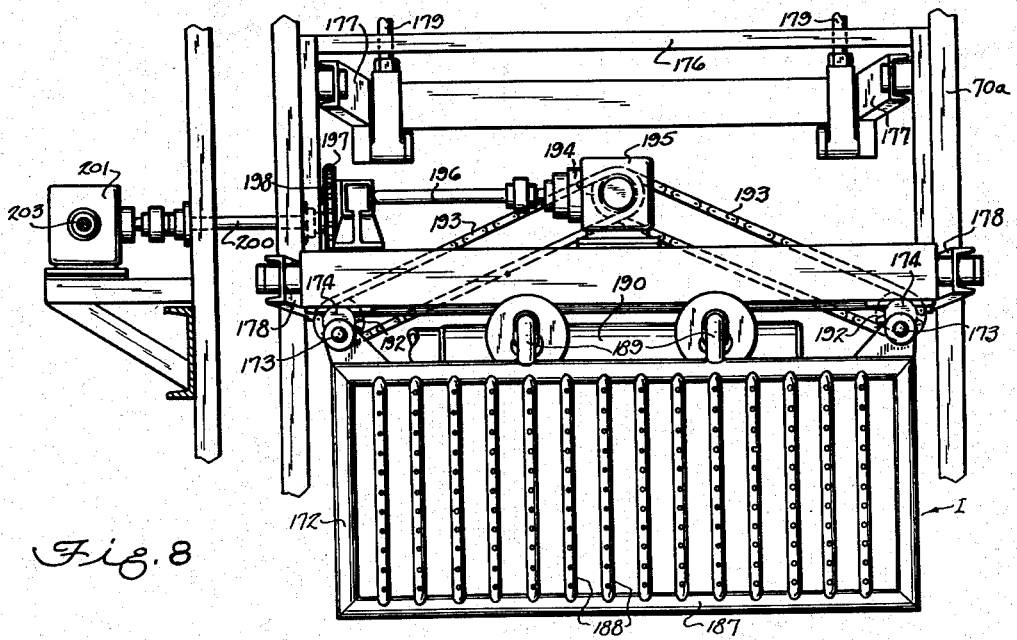
Fig. 8 is a vertical section taken substantially on line 8—8 of Fig. 7.
Figure 9:
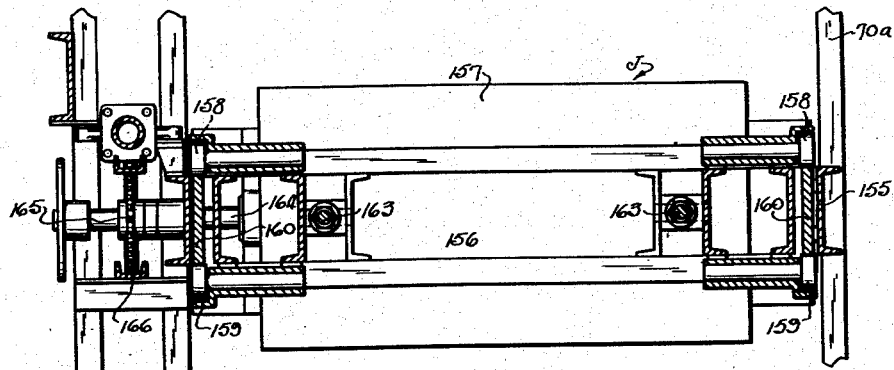
Fig. 9 is a vertical transverse section taken substantially on line 9—9 of Fig. 6.

General statement of construction and operation of apparatus

With reference now to the drawings and particularly to Fig. 1, the letter A designates in its entirety a heating furnace in which the glass sheets or plates B, suspended in a vertical position from cars or carriers C, are heated to a temperature approximating the softening point of the glass preliminary to the sudden cooling thereof. The furnace A is of a horizontally elongated tunnel type construction having top and bottom and side and end walls cooperating to form an elongated heating chamber 25. Any suitable means may be employed for heating the chamber 25 to the desired temperature for supplying heat to the glass such as electric resistors carried by the opposite side walls 27 of the furnace. The electric resistors may be supplied in a suitable manner with energy and the supply of energy may be controlled so as to effect heating of the glass sheets rapidly and uniformly to the desired final temperature in chamber 25.

The top wall of furnace A is provided with a relatively narrow slot 30 extending longitudinally centrally thereof substantially throughout the length of the furnace, said slot being widened at one end thereof to provide a furnace entrance opening 31 and at its opposite end a furnace discharge opening 32 (Fig. 2).

Mounted above the furnace A over the entrance opening 31 in the top wall thereof is a charging elevator mechanism designated in its entirety by the letter D, while located above the furnace over the discharge opening 32 is a discharge elevator mechanism generally indicated by the letter E. Associated with the charging and discharge elevator mechanisms D and E is an overhead, external conveyor F which extends preferably in the form of a loop (not shown) from the discharge elevator mechanism E to the charging elevator mechanism D to provide a conveyor communication between the discharge elevator and charging elevator.

The external conveyor F preferably comprises a monorail inverted T-track 33 formed with appropriate straight and curved portions to provide any desired form of loop, and the track 33 may be suspended in any usual manner by suspension members 34 (Fig. 1).

The external conveyor loop-track 33 terminates at one end at the charging elevator mechanism D to provide a loading station, generally indicated at G, while the other end of said track terminates at the discharge elevator mechanism E to provide an unloading station, generally indicated at H; an end of the station G being adjacent to and elevated substantially vertically above an end of the furnace entrance opening 31, and an end of the station H being adjacent to and elevated substantially vertically above an end of the furnace discharge opening 32.

Associated with the discharge elevator mechanism E is the cooling mechanism designated in its entirety by the letter I for chilling the glass sheets B upon withdrawal thereof from the furnace, while also associated with the discharge elevator mechanism E is the bending mechanism, generally indicated by the letter J for bending the glass sheets prior to cooling, if bent tempered glass is being produced. Although bending means has been illustrated in the drawings and will be herein described in detail, it will be understood that the bending step may be omitted if it is desired to produce flat sheets of tempered glass.

In operation, glass sheets B to be tempered are suspended from cars or carriers C on the external conveyor F and moved to the loading station G adjacent the charging elevator mechanism D. A carrier, with the attached glass sheet, is then moved onto the charging elevator and the sheet lowered into the furnace through the opening 31. The top wall of the furnace is provided along opposite sides of the narrow slot 30 and the entrance and discharge openings 31 and 32 respectively with longitudinal track slide bars for supporting the carrier C upon lowering of the glass sheet within the furnace.

The carrier C is then moved intermittently through the furnace by the pusher means K to the discharge opening 32. Upon reaching said discharge opening, the carrier is lifted from the furnace by the discharge elevator to bring the glass sheet into position for being operated upon by the bending mechanism J. After being bent, and while maintained in the same position, the glass sheet is adapted to be suddenly chilled by the cooling mechanism I to complete the tempering of the glass. The carrier and tempered glass sheet are then raised to bring said carrier into position where it can be transferred from the discharge elevator onto the external conveyor F at the unloading station H. The tempered glass sheet can then be detached from the carrier and the empty carrier returned along the track 33 to the loading station G where another sheet to be tempered can be attached thereto.

Carrier pusher means

The pusher means K which is employed for advancing the carriers C through the furnace A in a step by step fashion is best illustrated in Fig. 1. Such pusher means includes a vertically disposed hydraulic cylinder 42 mounted at 43 at a lower corner of the entrance end of the furnace. A piston (not shown) operates in cylinder 42, and the piston rod 44 thereof is provided at its upper end with a rack 45 which is in engagement with a pinion keyed to one end of a horizontal shaft 48.

Mounted upon the opposite end of shaft 48 is a gear engaging a rack portion formed on the underside of a pusher bar 51. The pusher bar 51 is backed up above the gear by a roller 52 mounted at 53 on the channel pusher frame 54. The forward end of the pusher bar 51 is provided with a pusher nose, while the rear end thereof is provided with a spring-tensioned, slide pad 56 pivoted at 57 to the said pusher bar, said pad 56 engaging and sliding along upon the pusher frame 54 for centering, guiding, and steadying the pusher bar during operation thereof.

When each succeeding carrier C is lowered by the charging elevator to rest upon the furnace slide bars above the entrance opening 31 of the furnace, the pusher means K is operated to cause the pusher bar 51 to engage the carrier and advance it, together with the series of carriers ahead of it, along the furnace evenly and steadily and with a minimum of jarring to the glass sheets suspended from the carriers. This is accomplished by introducing oil into the cylinder 42 to force piston rod 44 upwardly whereupon the rack 45 will rotate the pinion to turn shaft 48 and the gear keyed thereto. The gear, meshing with the rack portion of pusher bar 51, will move said pusher bar forwardly, whereupon the pusher nose will engage the outer end of the carrier above the entrance opening 31 of the furnace and advance the same forwardly a sufficient distance to uncover the entrance opening so that another sheet may be lowered into the furnace. To return the pusher bar 51 to inoperative position, it is only necessary to draw the piston rod 44 downwardly to rotate the shaft 48 in the opposite direction. The pusher bar should of course be operated so as to avoid undue jarring of or shock to the carriers at both the beginning and end of its pushing stroke. This may be accomplished by controlling the supply of oil to the cylinder 42 so that the pusher bar will start forwardly at a relatively slow speed and its speed of movement gradually increased and then gradually decreased at the end of the pushing stroke.

*Glass carriers*

The carriers C provided for supporting the glass sheets B during tempering and certain parts associated therewith incorporate known features of design for avoiding glass handling difficulties and, in addition, are capable of being handled on the external conveyor F, on the charging and discharging elevators D and E, and along the furnace track. Each carrier C includes a preferably box-like body member 58 which may be filled with any suitable insulation material. When the carrier is passing along furnace A, the body member 58 is supported upon and slides along the track slide bars. Alternatively, the track slide bars may be formed as rails and the carrier body member 58 provided with wheels to ride on such rails. However, the sliding arrangement shown is preferred for more effectively closing and sealing the furnace slot 30 and end openings 31 and 32.

Attached to and depending from the carrier body member 58, at opposite ends thereof, are vertical bars 60 which in turn support a substantially horizontal bar 61, the upper face of which is preferably grooved. When a carrier C is positioned on the furnace track slide bars, the horizontal bar 61 thereof is located within the furnace heating chamber 25. Carried by the horizontal bar 61 are tongs 63 of known design for suspending the glass sheet B in a vertical position, said tongs having portions received within the groove in the upper face of bar 61.

Although the glass sheets B are shown as being of a size and shape used for the rear lights of closed automobiles, it will be appreciated that the invention is not limited to the tempering of any particular shape of glass sheet because glass of various sizes and shapes can be handled in the improved apparatus by suitably modifying the bending and cooling mechanisms if necessary. Moreover, more than one glass sheet may be suspended from each carrier C as by lengthening the vertical bars 60 and providing a plurality of spaced horizontal bars 61.

The carriers C are moved longitudinally of the furnace A by the pusher means K above described, the pusher nose of pusher bar 51 engaging the outer end of the body member 58 of the carrier. Each carrier is also preferably provided with one or more lugs for guiding the carrier as it passes along the furnace and for centering the bars 60 thereof in the narrow furnace slot 30. The furnace slot 30 is preferably only wide enough to permit free passage of the carrier bars 60, and the enlarged openings 31 and 32 at the ends of slot 30 are preferably only wide enough to permit entry of the tongs 63, suspending the glass sheets B, into and removal of the same from the furnace heating chamber 25.

Previously known glass handling carriers have incorporated some of the general features just described, but the present invention also involves the supporting and transporting of the carriers on the external conveyor track F. For this purpose, each carrier C is also provided at its opposite ends with wheels 64 rotatably mounted on U-shaped bracket yokes 65 and adapted to engage the inverted T-shaped external conveyor track 33. The yokes 65 are pivotally mounted on the carrier body member 58 to permit horizontal rotation of the yokes as required by curvature in the external conveyor track 33.

*Discharge elevator mechanism*

The discharge elevator mechanism E is similar to the charging elevator mechanism D. The construction is best illustrated in Figs. 1, 2, 3, 4 and 5 and includes a frame structure 70a certain parts of which are omitted or broken away in some of the views for the sake of clearness. Spaced upper and lower guide bearings 71a and 72a are mounted on the frame structure 70a near the upper end thereof (Figs. 2 and 4) and on opposite sides centrally of the so-called elevator shaft formed generally by the frame 70a.

The elevator car, generally indicated at 73a includes a pair of vertically movable, hollow slide rods 74a and 75a which slide through said guide bearings 71a and 72a and to the upper and lower ends of which are secured the frame members 76a and 77a.

The elevator car 73a moves vertically between upper and lower limiting positions, the lower position being shown in Figs. 2 and 3 and the upper position being shown in Fig. 1. The elevator car also has a third or intermediate position of rest when the glass sheet B on carrier C, being raised by the elevator car, is stopped for treatment at a bending and cooling station intermediate the limits of the discharge elevator car travel as shown in Figs. 4 and 5. At the intermediate station, the glass sheet is acted upon successively by the bending mechanism J and cooling mechanism I or by the cooling mechanism I only if the sheet is not adapted to be bent.

Movement of the elevator car 73a is effected by an operating mechanism which includes a horizontally arranged hydraulic cylinder 78a mounted at 79a on the discharge elevator frame 70a near the upper end thereof. A piston (not shown) operates in cylinder 78a and the piston rod 80a thereof is provided with a rack 81a backed up by a roller and engaging a pinion 83a mounted on one end of a horizontal shaft 84a extending at right angles to cylinder 78a.

Two driven sprockets 85a are mounted on shaft 84a within the so-called elevator shaft and over which are trained the sprocket chains 86a. These chains also pass under idler sprockets 87a mounted upon shaft 88a and over idler sprockets 89a carried by shaft 90a, Fig. 2; said shafts 88a and 90a being parallel with shaft 84a and also mounted upon elevator frame 70a. One end of each of chains 86a is secured to the lower car frame member 77a while a counterweight 82a is secured to the other end of each chain 86a for balancing the weight of the elevator car.

The stopping of the discharge elevator car 73a at the third or intermediate position to bring the glass sheet B to rest at the bending and cooling station is automatically accomplished by apparatus including a hydraulic stop cylinder 126 (Figs. 2 and 3) mounted at 127 on the discharge elevator frame 70a near the top thereof in alignment with hydraulic cylinder 78a.

A piston (not shown) operates in cylinder 126, and the piston rod 128 thereof is provided with a ram head 129 which, when extended, will arrest the motion of rack 81a carried by piston rod 80a and thus prevent completion of the upward elevator stroke at a predetermined point associated with suspension of a glass sheet at the bending and cooling station as illustrated in Figs. 4 and 5. This is achieved by making the cylinder 126 and piston therein of larger diameter than the cylinder 78a and piston therein and by supplying the same hydraulic pressure to both cylinders when operating the piston in cylinder 78a.

Associated with the unloading station H and discharge elevator mechanism E is a discharge elevator unloading mechanism, generally indicated at 130 (Figs. 1, 2, 3, 12 and 13), and including a hydraulic cylinder 131 mounted at 132 on a frame support 133 extending from the discharge elevator frame 70a. A piston (not shown) operates in cylinder 131, and the piston rod 134 thereof has secured to its outer end a pusher nose 135 which is also secured to an inverted T-shaped track guide bar 136 (Fig. 13). The flanges of track guide bar 136 engage upper flanged rollers 137 and lower flanged rollers 138 rotatably journaled respectively at 139 and 140 on frame support 133.

The discharge elevator unloading mechanism 130 is so arranged that by operating piston 134 from left to right in Figs. 1 and 12, a carrier C disposed at the unloading station H will be engaged by pusher nose 135 and discharged from the elevator car 73a onto the external conveyor track 33. In thus unloading a carrier C from the discharge elevator car 73a, the car must of course be in the raised position shown in full lines in Fig. 1 and the carrier body member 58 is at that time in alignment with unloading cylinder 131.

*Cullet pan*

The furnace discharge opening 32 is covered at certain times for several purposes to be later described, and for accomplishing this there is provided a cullet pan 141 having wheels 142 which ride on rail members 143 supported on the furnace frame structure 40 (Figs. 1, 2, 3 and 4). The cullet pan 141 moves from a position above the furnace discharge opening 32 as shown in full lines in Fig. 1, to a retracted position shown in broken lines in said figure and in full lines in Fig. 3 to uncover said discharge opening. The operating mechanism for the cullet pan includes a vertically disposed air cylinder 144 mounted at 145 in a lower corner of the exit end of the furnace.

A piston (not shown) operates in cylinder 144 and the piston rod 146 thereof is provided with a rack 147 at its upper end which is backed up by a roller 148 and meshes with a piston 149 mounted on one end of a horizontal shaft 150. Keyed to the opposite ends of shaft 150 are sprockets 151 for driving sprocket chains 152 which also pass over another set of sprockets 153 mounted adjacent to the inner end of furnace discharge opening 32. The cullet pan 141 is secured by fingers 154 to the chains 152 whereby movement of the piston in cylinder 144 in one direction or the other moves the cullet pan to the two positions illustrated in Fig. 1.

The cullet pan 141 is provided for covering the furnace discharge opening 32 and carriers thereat to protect the same at all times except when the discharge elevator 73a is removing or about to remove a carrier from the furnace through the opening 32. This protection is desired so that an accumulation of broken glass or cullet on the carriers will be prevented, since such accumulation might interfere with engagement or disengagement of the carriers by the elevators.

*Bending mechanism*

Figure 10:
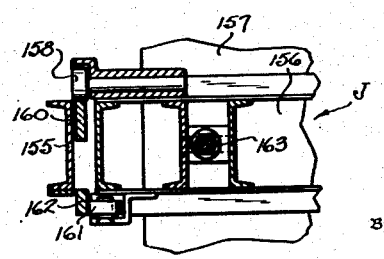
Fig. 10 is a detail section taken substantially on line 10—10 of Fig. 6.

The bending mechanism J is located at the bending and cooling station intermediate the limits of travel of the discharge elevator car 73a within the so-called shaft of the discharge elevator immediately above the furnace discharge opening 32. The bending mechanism J (Figs. 1, 2, 4, 5, 6, 9, 10 and 11) is mounted in a subframe structure 155 carried by the discharge elevator frame 70a and includes opposed wheeled mold carriages 156 provided with detachable bending molds 157 of the desired curvature. The mold carriages 156 are each provided with upper wheels 158 and lower wheels 159 which engage and ride on trackways 160 and 160a. Each mold carriage is also provided with lower side thrust wheels 161 (Fig. 10) which engage and ride on trackways 162. The wheel and track mounting of the mold carriages 156 just described maintains alignment of the molds and exact matching thereof when operated.

The mold carriages 156 are actuated for reciprocating movement toward and away from one another by connecting rods 163 and crank shafts 164 having sprockets 165 thereon, said crank shafts 164 being also mounted in frame structure 155. Passing around both sprockets 165 is a sprocket chain 166 preferably having its upper strand attached, as at 167, to the connected piston rods 168 and 169 of a pair of opposed single acting hydraulic cylinders 170 and 171 respectively, which cylinders are also mounted on frame structure 155.

The cylinders 170 and 171 are of such length as to produce a 360 degree rotation of crank shafts 164 with a single stroke, thus moving the molds 157 from their retracted position shown in Figs. 1, 2, 5 and 6 toward each other to the closed position shown in Fig. 4 and again to retracted position during said 360 degree rotation of the crank shafts 164. Of course, the next time the pistons in cylinders 170 and 171 are operated, the piston rods 168 and 169 thereof move in the opposite direction so as to again produce a 360 degree rotation of crank shafts 164 but in the opposite direction.

The 360 degree rotation of crank shafts 164 is used to avoid any delay, even momentarily, incident to valve reversal if the crank shafts were operated 180 degrees and then reversely rotated 180 degrees. The effect of such delay, even for an instant, would be harmful because of a chilling effect to the glass when under pressure between the molds 157. The arrangement herein provided for operating bending molds 157 by connecting rod and crank shaft means, assuming constant angular velocity thereof, produces simple harmonic motion of the molds.

This cycle of operation is desirable because the glass must not be subjected to excessively rapid bending. However, the bending operation must be performed in a minimum permissible time. With this arrangement, the mold movement for the most part is quick and the molds are preferably moved to perform the bending operation and back to a retracted position within about two seconds.

Another advantage of the connecting rod and crank means for actuating the mold carriages 156 is that, upon rotation of the crank shafts 164, the molds 157 will be moved first slowly, then faster, then slowly toward each other into bending position, and immediately slowly, then faster, and then slowly away from each other to a retracted position. Thus, it is preferred that the mold carriages 156 start relatively slowly toward each other and gradually accelerate to full speed. After somewhat less than 180 degrees of travel of crank shafts 164, and as mold carriages approach closed position, the rotation of the crank shafts is gradually reduced. The result is a gradual squeezing action of the glass between molds 157 followed by an immediate opening of the molds. As 360 degree rotation is approached, the speed of crank rotation is reduced so that the final stop at the end of cylinder stroke may occur without excessive shock. This operation of the molds results from the provision of the crank shaft and connecting rod drive and may be further controlled by the manner in which oil is supplied to the cylinders 170 and 171.

In order to adjust the limits of movement of the mold carriages 156 toward each other, the connecting rods 163 may consist of spaced sleeve portions connected by the turnbuckle means 163' so that upon adjustment thereof the connecting rods may be shortened or lengthened as desired to vary the limits of movement of the mold carriages and molds toward each other.

The curved or bent sheets of glass resulting from the bending operation are indicated at BB in Figs. 4, 5 and 7.

Cooling mechanism

The cooling mechanism I for suddenly cooling or chilling the glass sheet B after it has been bent to the desired curvature by the bending mechanism J is also mounted on the discharge elevator frame 70a and is best shown in Figs. 1, 2, 3, 4, 5, 7 and 8. Such cooling mechanism includes a pair of curved air blower or blast heads 172 having substantially the curvature of molds 157 and bent glass sheets BB (Figs. 6 and 7). The blast heads 172 are pivotally mounted at each upper corner thereof as at 173 upon crank shafts 174 carried in housings 175.

The housings 175 are secured to lower longitudinal box members of substantially rectangular support frames 176. Support frames 176 are each pivotally carried at the inner ends of upper supporting arms 177 and lower supporting arms 178, the outer ends of which are pivotally mounted to fixed discharge elevator frame 70a.

Thus, viewing Fig. 2, each support frame 176, arms 177 and 178, and elevator frame 70a form an approximate parallelogram system movable between an upper limiting position shown in Figs. 1, 2, 3 and 4 and a lower limiting position shown in Figs. 5, 7 and 8. The parallelogram is said to be approximate because the distance between the pivotal mountings of arms 177 and 178 on support frame 176 is slightly greater than the distance between the pivotal mountings of said arms on elevator frame 70a for a purpose to be later described.

Movement of the support frames 176, and therefore the blast heads 172 carried thereby, from the upper position shown in Fig. 2 to the lower position shown in Fig. 5 is effected by operation of connecting rods 179 pivotally connected to upper support arms 177 and to crank shafts 180.

Mounted at one end of each crank shaft 180 is a sprocket 181 and passing around both sprockets 181 is a sprocket chain 182 preferably having its upper strand attached at 183 (Fig. 3) to the piston rod 184 of hydraulic cylinder 185 mounted at 186 on discharge elevator frame 70a. The hydraulic cylinder 185 is of such length as to rotate crank shafts 180 through 180 degrees so that operation of the piston in cylinder 185 in one direction lowers blast heads 172 from the position of Fig. 2 to that of Fig. 5, and operation of the piston in the other direction raises blast heads 172 from the position of Fig. 5 to that of Fig. 2. When the blast heads 172 are in the position shown in Fig. 5, they occupy substantially the same position just previously occupied by the bending molds 157 at the bending and cooling position as illustrated in Fig. 4.

In producing bent tempered glass, it is necessary to perform the cooling operation as quickly as possible after removal of the glass from the furnace. However, the bending operation must be performed before the cooling operation so that it is desirable to perform both bending and cooling at one station immediately above the furnace exit opening. In this way, it is possible to avoid another movement of the glass while in a softened condition between the bending and cooling operations and which additional movement would tend to distort the bent sheet. It has been previously noted that the operation of the bending molds occurs in about two seconds and, as the bending molds are being retracted, blast heads 172 may be moved down.

In order to bring the blast heads 172 into proper position with respect to the bent sheets BB and also to the blast position as quickly as possible, the parallelogram previously referred to is made approximate rather than exact so as to enable the distance of mold travel to be reduced and therefore to save a fraction of a second of time for the removal of the molds, thus permitting downward movement of the blast heads 172 (as the molds are being retracted) to the blast position previously occupied by the molds 157 a little quicker.

Each blast head 172 is preferably formed of an outer tubular frame member 187 having a series of perforated tubes 188 connected thereto from which a series of fluid, preferably air jets, are blown. The air is supplied to each tubular frame 187 by flexible tubes 189 leading from headers 190. Headers 190 are connected (not shown) together by piping 191 and to a suitable main air valve (not shown).

The air blast jets should not be directed constantly at certain spots on the glass sheets BB being cooled and therefore it is preferred that the jets be moving at all times when on. For providing such movement, each blast head 172 is gyrated or rotated in a small circle in the general plane of the blast head by the mounting on crank shafts 174. Rotation of blast heads 172 results by constantly rotating crank shafts 174 through a drive best shown in Figs. 7 and 8 and including sprockets 192, chains 193, sprockets 194, gears in gear cases 195, shafts 196, sprockets 197, chains 198, sprockets 199, shafts 200, gears in gear cases 201, shafts 202 and 203, gears in gear case 204, driven by motor 205.

The foregoing constitutes a detailed description of the various parts of the improved apparatus for handling and heat treating glass. In connection with the illustration of some mechanisms in certain of the figures of the drawings, some parts which would normally appear in those figures have been omitted so as to provide a clearer illustration of the particular mechanisms shown in such figures of the drawings. For example, in many of the figures the frame structures have not been shown fully.

The counterbalance 92a is provided for the discharge elevator E to reduce the necessary operating effort and to keep the operating chain 86a tight on the sprockets.

Likewise, the pusher bar 51 is centered, guided, and steadied during operation thereof so that it will engage a carrier C above the furnace entrance opening and advance it, together with a series of carriers C ahead of it, along furnace A evenly and steadily and with a minimum of jarring to glass sheets suspended from the carriers.

The operation of the improved apparatus for handling and heat treating glass may be best described and understood by first briefly outlining the movement of a particular carrier C from which a glass sheet B is suspended through the apparatus and by then outlining the cycle of operation of the apparatus.

Movement of carriers

The carriers C are preferably manually moved along the external conveyor track 33 from the discharge elevator unloading station H to charging elevator loading station G. The bent tempered glass sheets BB are removed from carriers C at some convenient place either at one of said stations or between the same; and glass sheets B to be tempered are suspended from carriers C at some convenient place either at one of said stations or between the same along the external conveyor track 33.

A particular carrier C with a glass sheet B suspended therefrom is manually moved to a position somewhat as shown by the carrier at loading station G in Fig. 1, where said carrier is loaded onto the charging elevator car by a suitable loading mechanism. The charging elevator car then descends to "down" position to introduce the glass sheet B, suspended from said carrier C, into the heating chamber 25 of furnace A through the furnace entrance opening 31.

At the proper time, furnace pusher means K operates to advance the carrier C along furnace A together with all other carriers ahead of said carrier C in the furnace. When said carrier becomes, through successive operations of furnace pusher means K, the forward carrier of the series of carriers from which glass sheets B are suspended in heating furnace chamber 25; and is located at furnace discharge opening 32, the discharge elevator car 73a at the proper time descends to "down" position and engages said carrier C.

The discharge elevator car 73a then raises until glass sheet B is located at the bending and cooling station, whereupon bending mechanism J operates to bend the glass sheet to the shape indicated at BB and immediately the cooling mechanism I operates to chill the bent glass sheet BB suspended from said carrier at the bending and cooling station.

The discharge elevator car 73a is then raised to "up" position and discharge elevator unloading mechanism 130 operates to transfer carrier C from the discharge elevator car onto the external conveyor track 33 at the discharge elevator unloading station H. The carrier C is then moved either manually or by suitable mechanical means along external conveyor track 33, in turn, until the convenient station is reached where the bent heat treated sheet BB is removed from said carrier. Thereafter, a new sheet is suspended therefrom and the carrier is ready to again move through the apparatus in the manner just described. However, the improved apparatus does not handle only one carrier C at a time but handles a plurality of carriers at all times when in operation. That is to say, during the substantially continuous operation of the improved apparatus there is a carrier C at practically each station of progress through the apparatus so that several operations of the tempering cycle can be carried out at one time and with a minimum lapsed time per operation whereby maximum production from the apparatus may be obtained.

Cycle of operation

The cycle of operation of the improved apparatus for handling and heat treating glass may be conveniently described as consisting of twelve steps. Assuming that all parts of the apparatus are momentarily at rest with discharge elevator car 73a in "down" position engaging wheels 64 of a carrier C located at discharge opening 32 of heating furnace A, these steps are as follows:

*Step 1.*—The discharge elevator car 73a then moves upwardly by operation of cylinder 78a until stopped by the ram head 129 of stop cylinder 126. At this time, the glass sheet B on carrier C will be suspended at the bending and cooling station.

*Step 2.*—Bending mechanism J operates to move molds 157 toward each other to effect bending of the glass sheet B (Fig. 4) to shape BB and then return to open position shown in Fig. 6 by operation of cylinders 170 and 171. At the same time, cullet pan 141 moves into the position shown in full lines in Fig. 1 by operation of air cylinder 144.

*Step 3.*—The blast heads 172 of cooling mechanism I then move downwardly to the position shown in Fig. 5 by operation of cylinder 185. The blast heads are then rotated or gyrated by motor 205 which runs continuously. At the same time, furnace pusher means K moves to the right (Fig. 1) by operation of cylinder 42 to advance the series of carriers C along furnace A.

*Step 4.*—Furnace pusher means K retracts by operation of cylinder 42.

*Step 5.*—The charging elevator car lowers to the "down" position.

*Step 6.*—Charging elevator car raises to "up" position.

*Step 7.*—A carrier C from loading station G is transferred onto charging elevator car.

*Step 8.*—Blast heads 172 of cooling mechanism I are raised to position shown in Figs. 2 and 4 by operation of cylinder 185.

*Step 9.*—The ram head 129 retracts or moves to left (Fig. 2) by operation of stop cylinder 126 permitting discharge elevator cylinder 78a to raise discharge elevator 73a from bending and cooling station to "up" position shown in Fig. 1.

*Step 10.*—Discharge elevator unloading mechanism 130 moves carrier C from discharge elevator car 73a to unloading station H by operation of cylinder 131.

Step 11.—Discharge elevator unloading mechanism 138 retracts by operation of cylinder 131. Cullet pan 141 moves out to the position shown in broken lines in Fig. 1 by operation of air cylinder 144.

Step 12.—Discharge elevator car 73a lowers to "down" position by operation of cylinder 78a. Discharge elevator ram head 129 moves out to "stop" position shown in Fig. 3 by operation of stop cylinder 126.

In certain figures of the drawings, which are general views, the parts of more than one of the related mechanisms are shown; and for illustrative purposes they are shown in positions which they are not in coincidentally. Thus, in Fig. 1, the charging elevator mechanism D is shown with the elevator car thereof in "down" position and the discharge elevator mechanism E is shown with the elevator car 73a thereof in "up" position. Referring to the above cycle of operations, the two elevator cars are never coincidentally in the positions shown; for when the discharge elevator car 73a is "up" (steps 9 to 12) the charging elevator car is also up and when the charging elevator car is down (step 5) the discharge elevator car is at the intermediate bending and cooling station.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for bending glass sheets, bending mechanism including opposed mold carriages, molds carried by said carriages, means for mounting said carriages for reciprocating movement toward and away from one another, means for reciprocating said carriages with a substantially continuous motion, comprising a crank shaft associated with each carriage and mounted for rotary movement through 360 degrees to move said molds into and out of bending position, connecting rods between each carriage and its associated crank shaft, and means for simultaneously rotating each crank shaft continuously in one direction through 360 degrees.

2. In apparatus for bending glass sheets, bending mechanism including opposed mold carriages, molds carried by said carriages, means for mounting said carriages for reciprocating movement toward and away from one another and for maintaining alignment and matching of said molds upon reciprocation of said carriages, means for reciprocating said carriages with a substantially continuous motion, comprising a crank shaft associated with each carriage and mounted for rotary movement through 360 degrees to move said molds into and out of bending position, connecting rods between each carriage and its associated crank shaft, and means for simultaneously rotating each crank shaft continuously in one direction through 360 degrees.

3. In apparatus for bending glass sheets, bending mechanism including opposed mold carriages, molds carried by said carriages, means for mounting said carriages for reciprocating movement toward and away from one another, means for reciprocating said carriages with a substantially continuous motion, comprising a crank shaft associated with each carriage and mounted for rotary movement through 360 degrees to move said molds into and out of bending position, connecting rods between each carriage and its associated crank shaft, means for simultaneously rotating each crank shaft continuously in one direction through 360 degrees, and means associated with said reciprocating means for adjusting the limits of movement of each carriage toward the other.

4. In apparatus for bending glass sheets, bending mechanism including opposed mold carriages, molds carried by said carriages, means for mounting said carriages for reciprocating movement toward and away from one another and for maintaining alignment and matching of said molds upon reciprocation of said carriages, means for reciprocating said carriages with a substantially continuous motion, comprising a crank shaft associated with each carriage and mounted for rotary movement through 360 degrees to move said molds into and out of bending position, connecting rods between each carriage and its associated crank shaft, means for simultaneously rotating each crank shaft continuously in one direction through 360 degrees, and means associated with said reciprocating means for adjusting the limits of movement of each carriage toward the other.

5. In apparatus for bending glass sheets, bending mechanism including opposed mold carriages, molds carried by said carriages, means for mounting said carriages for reciprocating movement toward and away from one another and means for moving said carriages first slowly, then faster, then slowly toward each other to bring the molds into bending position, then slowly, then faster and then slowly away from each other to a retracted position with a substantially continuous motion comprising a crank shaft associated with each carriage and mounted for rotary movement through 360 degrees, connecting rods between each carriage and its associated crank shaft, and means for simultaneously rotating each crank shaft continuously in one direction and at a constant speed through 360 degrees.

6. In apparatus for bending and tempering glass sheets, means for supporting the sheet heated to a temperature approximately the softening point of the glass in a vertical position, bending mechanism including opposed mold carriages, molds carried by said carriages, means for mounting said carriages for reciprocating movement toward and away from one another to bend said sheet between said molds to the desired curvature, means for reciprocating said carriages; and cooling mechanism including opposed cooling elements mounted above said bending mechanism for movement into cooling position at opposite sides of the glass sheet, and means for moving said cooling elements downwardly into said cooling position to effect cooling of the said sheet after it has been bent between said molds and the said molds have been moved out of contact with the sheet surfaces.

7. In apparatus for bending and tempering glass sheets, supporting means engaging the sheet adjacent its upper edge at points separated from each other for suspending said sheet heated to a temperature approximately the softening point of the glass in a vertical position, bending mechanism including opposed mold carriages, molds carried by said carriages, means for mounting said carriages for reciprocating movement toward one another to bring said molds into engagement with opposite surfaces of said sheet to bend the same therebetween to the desired curvature and for then moving the said molds out of contact with the sheet surfaces, means for reciprocating said carriages; and cooling mechanism including opposed blast heads mounted above said bending mechanism for movement into cooling position at opposite sides of the glass sheet, means for moving said cooling elements downwardly into said cooling position after the said sheet has been bent between said molds and the said molds have been moved out of contact with the sheet surfaces, and means for supplying air under pressure to said blast heads to effect cooling of said sheet.

8. In apparatus for bending and tempering glass sheets, supporting means engaging the sheet adjacent its upper edge at points separated from each other for suspending said sheet heated to a temperature approximately the softening point of the glass in a vertical position, bending mechanism including opposed mold carriages, molds carried by said carriages, means for mounting said carriages for reciprocating movement toward one another to bring said molds into engagement with opposite surfaces of said sheet to bend the same therebetween to the desired curvature and for then moving the said molds out of contact with the sheet surfaces, means for reciprocating said carriages; and cooling mechanism including opposed blast heads arranged above said bending mechanism and mounted for swinging movement into cooling position at opposite sides of said sheet inwardly of said molds when the said molds have been moved out of contact with the sheet surfaces, and means for swinging said blast heads downwardly and inwardly into said cooling position to effect cooling of said sheet as soon as the sheet has been bent between said molds and the molds moved out of contact with the sheet surface and for subsequently swinging said blast heads upwardly and outwardly out of cooling position.

9. In apparatus for bending and tempering glass sheets, supporting means engaging the sheet adjacent its upper edge at points separated from each other for suspending said sheet heated to a temperature approximately the softening point of the glass in a vertical position, bending mechanism including opposed mold carriages, molds carried by said carriages, means for mounting said carriages for reciprocating movement toward one another to bring said molds into engagement with opposite surfaces of said sheet to bend the same therebetween to the desired curvature and for then moving the said molds out of contact with the sheet surfaces, means for reciprocating said carriages; and cooling mechanism including opposed blast heads arranged above said bending mechanism, means for mounting said blast heads for swinging movement into cooling position at opposite sides of said sheet inwardly of said molds when the said molds have been moved out of contact with the sheet surfaces, means for swinging said blast heads downwardly and inwardly into said cooling position to effect cooling of said sheet as soon as said sheet has been bent and the bending molds moved out of contact with the sheet surfaces and for subsequently swinging said blast heads upwardly and outwardly out of cooling position, means for mounting said blast heads for oscillatory movement in their own general plane on said first-mentioned mounting means, a drive motor for oscillating said blast heads, and driving connections between said motor and said blast heads movable with said first-mentioned mounting means.

ORMOND H. PADDOCK.
JOHN L. DRAKE.